F. FITZHARRIS.
VEHICLE TIRE.
APPLICATION FILED MAR. 7, 1916.
1,214,291. Patented Jan. 30, 1917.
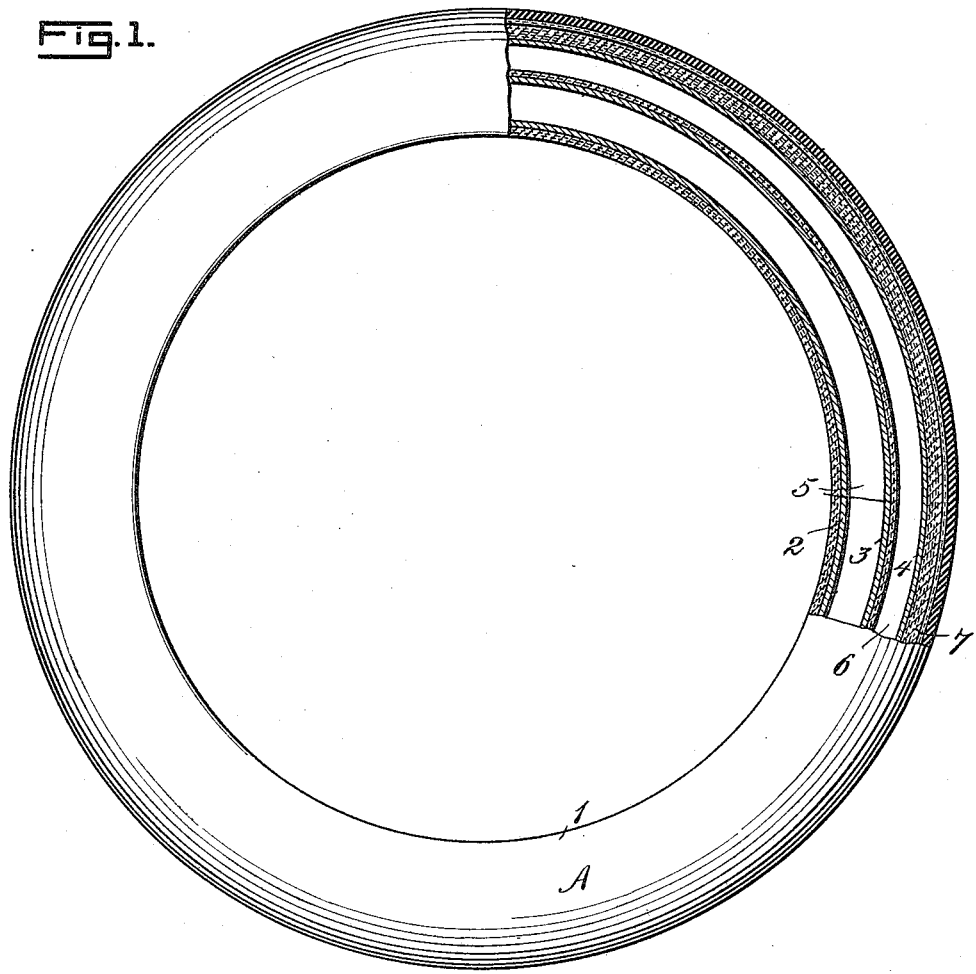
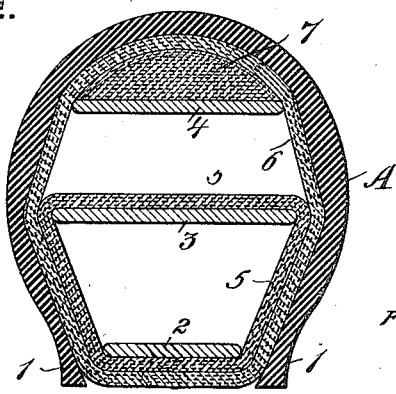
WITNESSES
INVENTOR
Frank Fitzharris
BY
ATTORNEYS

UNITED STATES PATENT OFFICE.

FRANK FITZHARRIS, OF TEXARKANA, TEXAS, ASSIGNOR OF ONE-HALF TO EDWARD JOHN NIXON, OF TEXARKANA, TEXAS.

VEHICLE-TIRE.

1,214,291.

Specification of Letters Patent.   Patented Jan. 30, 1917.

Application filed March 7, 1916.   Serial No. 82,592.

*To all whom it may concern:*

Be it known that I, FRANK FITZHARRIS, a citizen of the United States, and a resident of Texarkana, in the county of Bowie and State of Texas, have invented a new and Improved Vehicle-Tire, of which the following is a full, clear, and exact description.

This invention relates to vehicle tires of the non-pneumatic type, and the general objects of the present invention are to improve and simplify the construction of tires so as to be reliable and efficient in use, comparatively simple and inexpensive to manufacture, and so designed as to provide the maximum resiliency without the use of compressed air.

A more specific object of the invention is the provision of a vehicle tire which has an external appearance similar to the present pneumatic tires, but is devoid of the disadvantages thereof, the tire being constructed with a plurality of concentric spring rings which are bound together in such a manner that they maintain their concentricity at all points except at the bottom where a blow imparted to the wheel or the weight sustained by the wheel produces a local deformation.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in both the views, Figure 1 is a side view of the tire with a portion shown in section; and Fig. 2 is an enlarged transverse section.

Referring to the drawing, A designates a rubber or other flexible shoe or casing having its edges 1 suitably shaped to fit any desired vehicle rim. Within the shoe or casing A are concentric spring rings 2, 3 and 4 of successively increasing diameter in the order mentioned, the ring 2 being at the wheel rim-engaging portion of the tire, the ring 4, next to the tread portion of the tire, and the ring 3 intermediate the other two rings. These rings are bound together in such a manner that they maintain their concentric relation, but the outer and intermediate rings 4 and 3 may receive a local deformation, as when an obstacle produces a blow on the tire, but such a blow does not change the concentricity of the spring rings at other points. A tubular binding 5 binds the rings 2 and 3 together, such binding being pliable or flexible but inelastic, and the ring 4 is bound to the rings 2 and 3 by a tubular binding 6 which may be also of any desired pliable but inelastic material. The bindings 5 and 6 may be formed by winding tape around the rings, or, if desired, a cushioning pad or mass of material 7 may cover the outer surface of the outer ring 4 to form a back for the tread portion of the tire.

It will be understood that the light shocks or blows imparted to the tire will be taken up by the outer spring ring 4, but when greater blows are imparted to the tire the shock will be taken successively by the rings 4 and 3, so that the latter acts in a supplementary capacity.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A vehicle tire comprising a casing and a structure disposed within the casing to hold the same distended, said structure comprising three spring rings arranged concentrically within the casing and spaced apart one from another, a pliable binding extending around the inner and intermediate rings to normally hold the same in concentric relation and permit of local deformation of the intermediate ring under shocks, and a pliable non-elastic binding extending around the bound inner and intermediate rings and the outer ring for holding the latter normally in concentric relation with the intermediate ring and permitting of local deformation of the outer ring under shocks.

2. A vehicle tire comprising a casing and a structure disposed within the casing to hold the same distended, said structure comprising three spring rings arranged concentrically within the casing and spaced apart one from another, a pliable binding extending around the inner and intermediate rings to normally hold the same in concentric relation and permit of local deformation of the intermediate ring under shocks, and a pliable non-elastic binding extending around the bound inner and intermediate rings and the outer ring for holding the latter normally in concentric relation with the intermediate ring and permitting of local deformation of the outer ring under shocks, the intermediate ring being wider than the other rings.

3. A tire comprising a shoe, three spaced concentrically arranged rings disposed concentrically to and within the shoe, two of the rings lying at the inner and tread portions of the shoe respectively and the third ring lying between the others and normally separated therefrom by free open spaces, pliable inelastic means for binding the inner and intermediate rings together, and pliable inelastic means for binding the outer ring to the bound inner rings, said intermediate ring acting supplementary to the outer ring for receiving impacts too great to be sustained wholly by the outer ring.

4. A filler for a tire shoe, comprising three concentrically arranged spring rings in spaced relation, a binding extending transversely around the inner and intermediate rings to maintain the same in concentric relation, a binding extending around the outermost ring and the bound intermediate and inner rings for maintaining the outer ring in concentric relation with the intermediate ring, and a cushion disposed between the last-mentioned binding and the outer surface of the outer ring.

In testimony whereof I have signed my name to this specification.

FRANK FITZHARRIS.

Copies of this patent may be obtained for five cents each, by addressing the "Commissioner of Patents, Washington, D. C."